Figure 8:
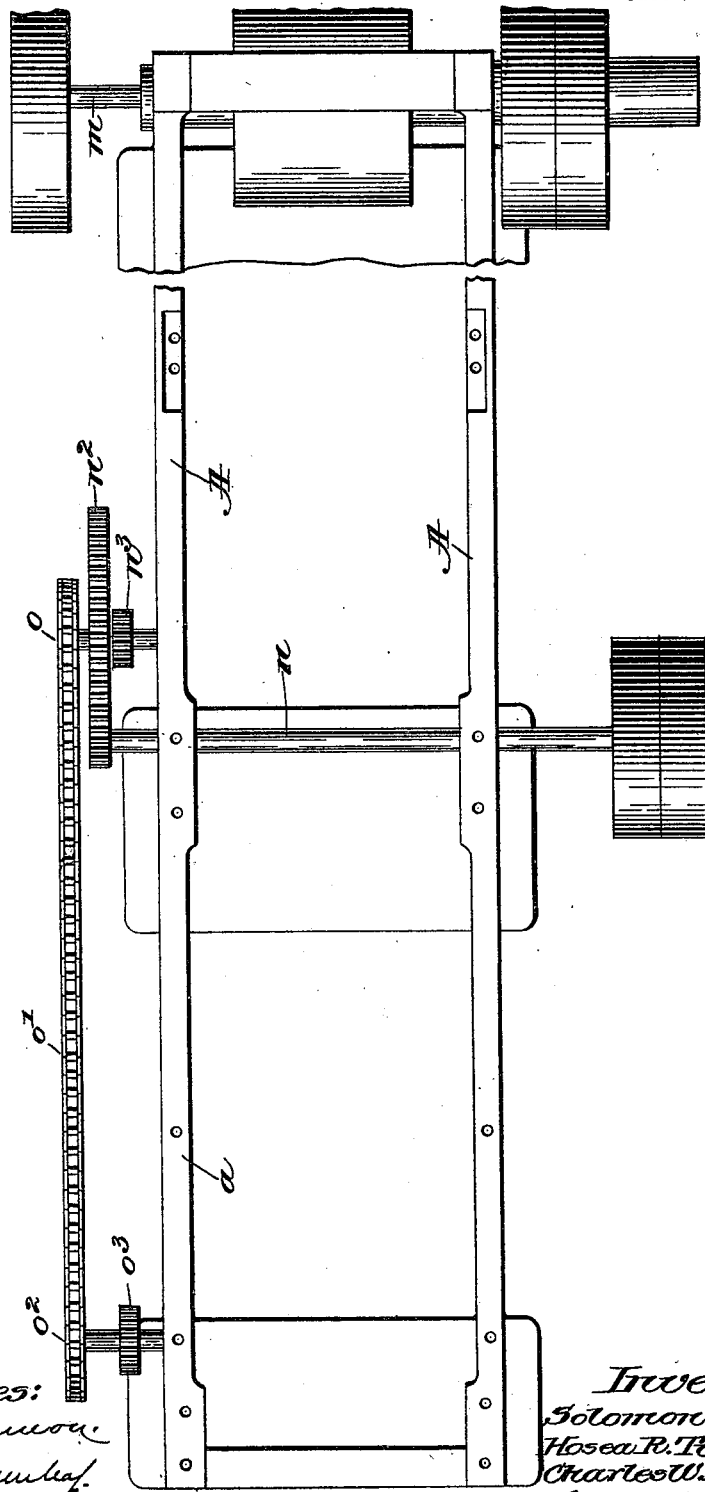

No. 623,938. Patented Apr. 25, 1899.
S. A. WOODS, H. R. TILLISON & C. W. H. BLOOD.
PLANING MACHINE.
(Application filed Mar. 21, 1896.)
(No Model.) 5 Sheets—Sheet 1.
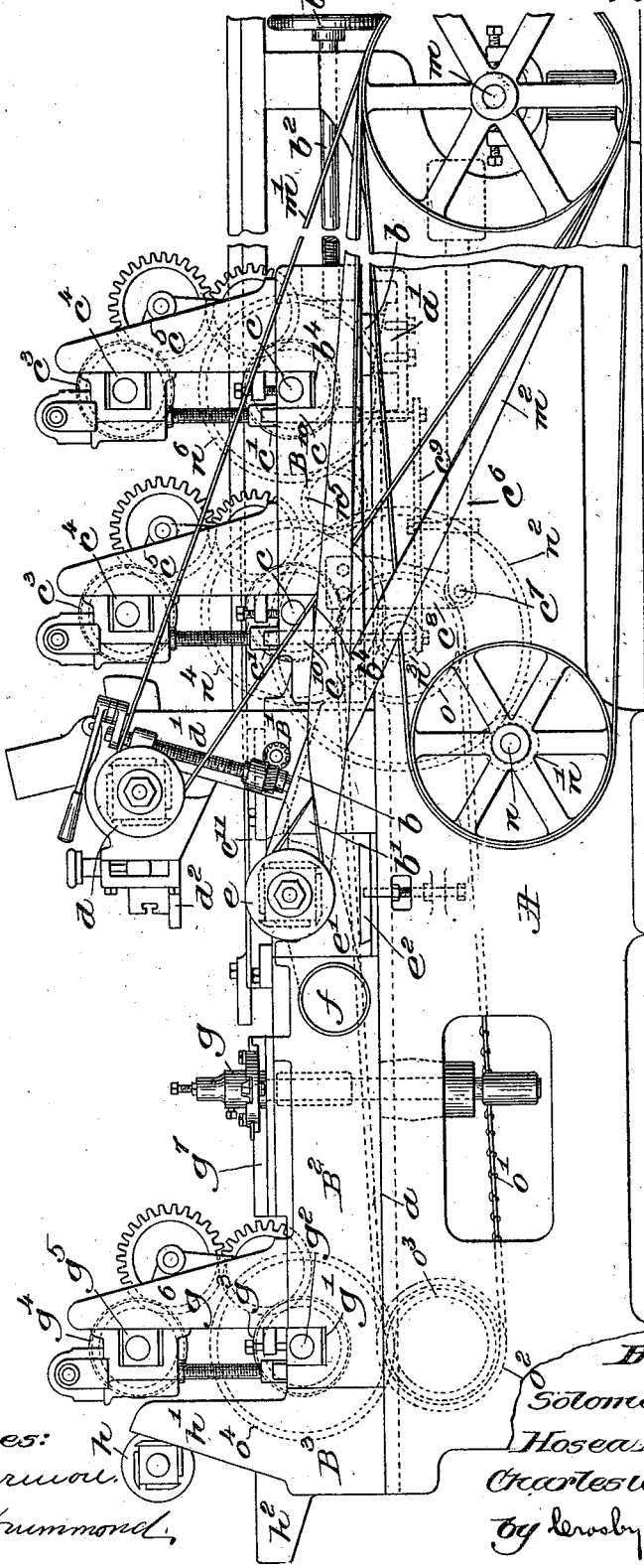

No. 623,938. Patented Apr. 25, 1899.
S. A. WOODS, H. R. TILLISON & C. W. H. BLOOD.
PLANING MACHINE.
(Application filed Mar. 21, 1896.)
(No Model.) 5 Sheets—Sheet 2.
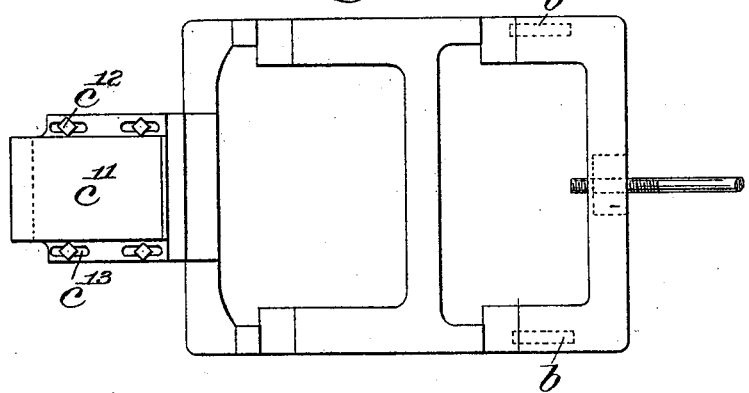
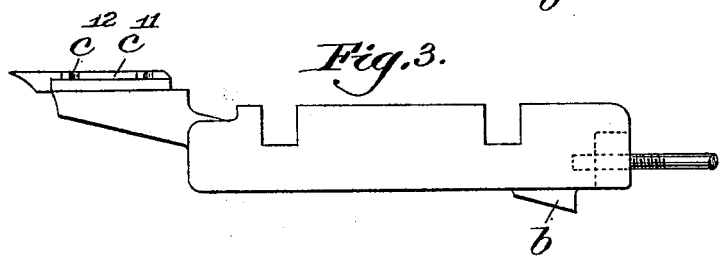
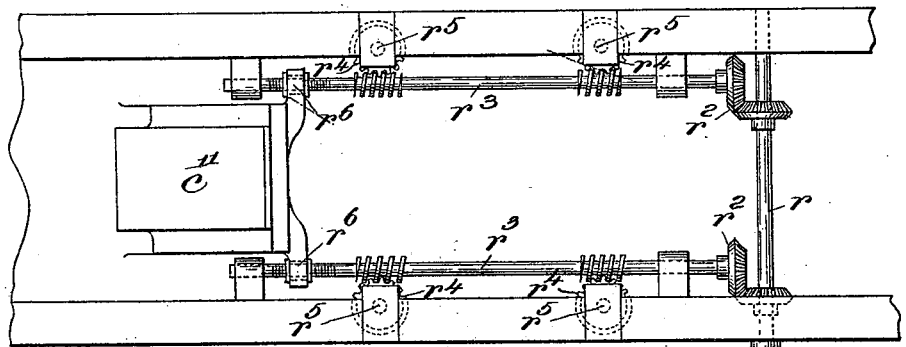
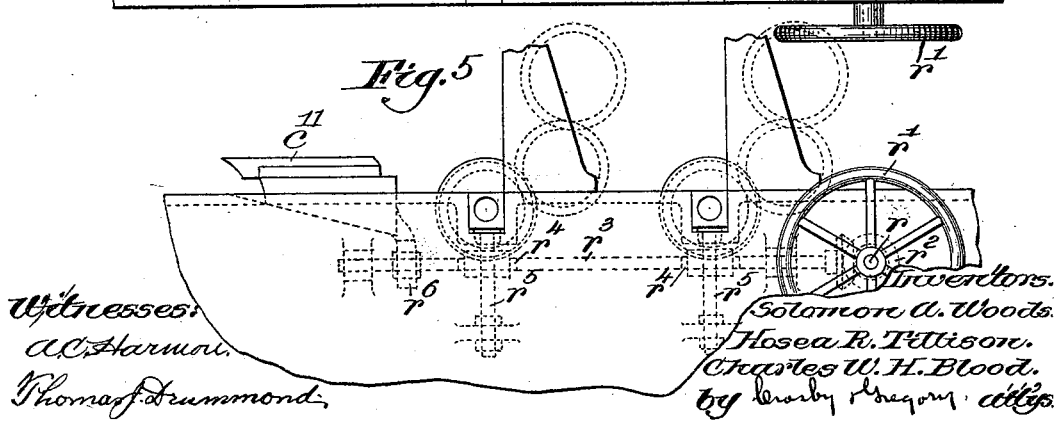

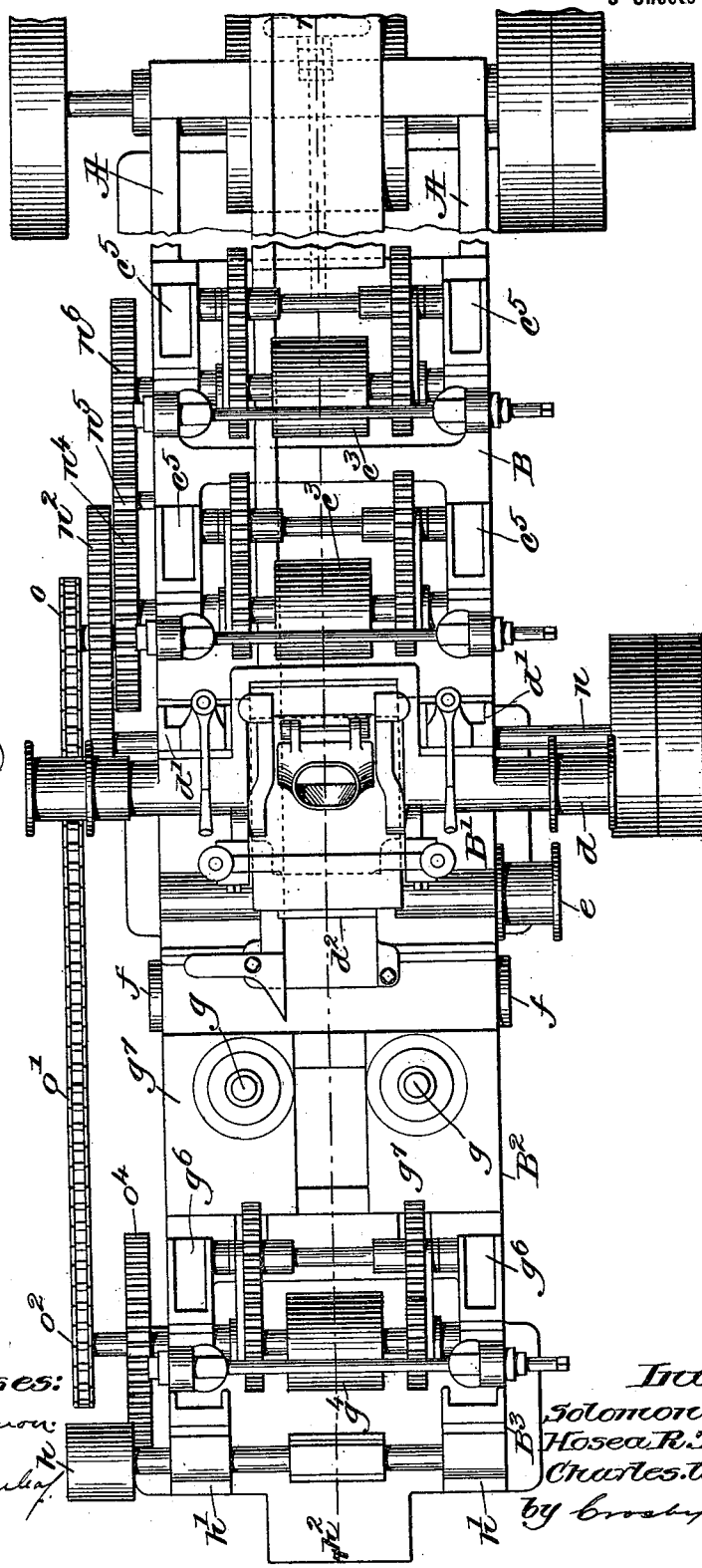

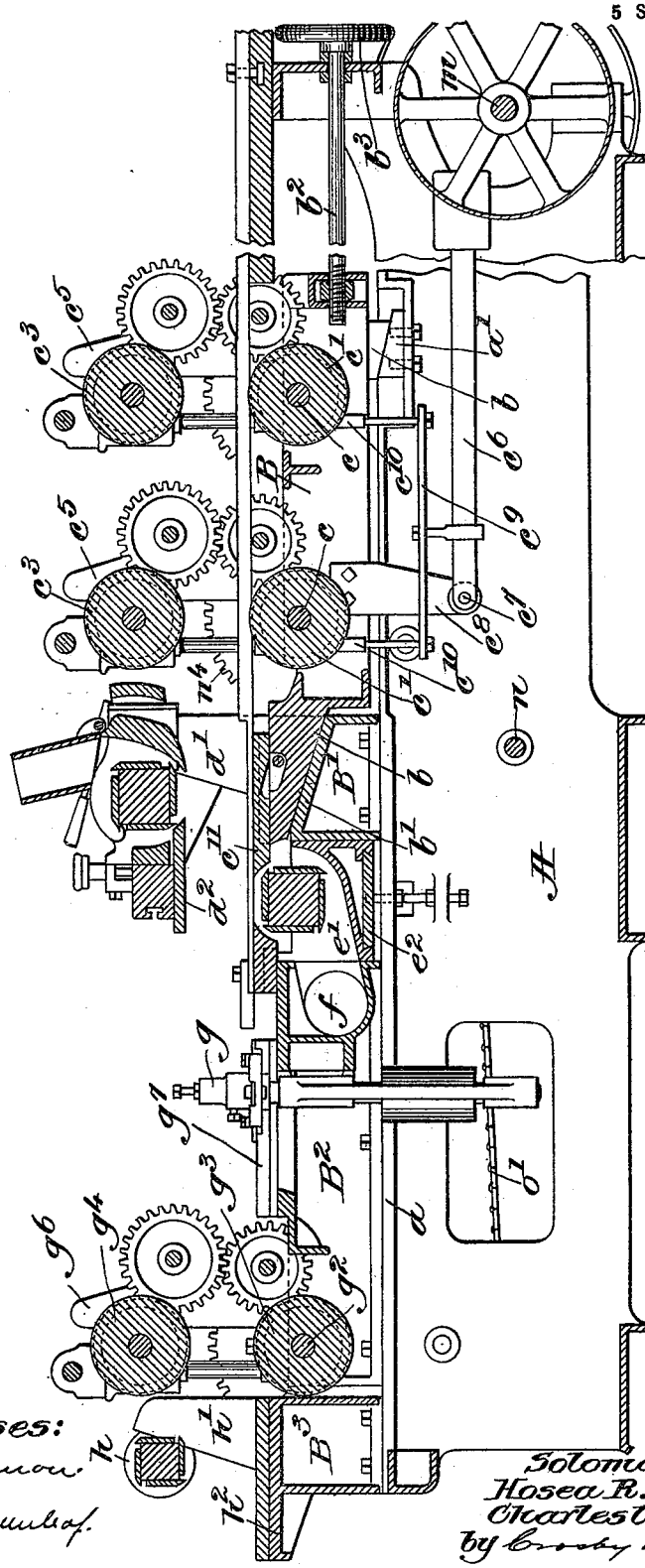

No. 623,938. Patented Apr. 25, 1899.
S. A. WOODS, H. R. TILLISON & C. W. H. BLOOD.
PLANING MACHINE.
(Application filed Mar. 21, 1896.)
(No Model.) 5 Sheets—Sheet 5.

Witnesses:
A.C. Harmon.
Fred S. Greenleaf.

Inventors:
Solomon A. Woods.
Hosea R. Tillison.
Charles W. H. Blood.
by Crosby & Gregory,
attys.

UNITED STATES PATENT OFFICE.

SOLOMON A. WOODS, OF BROOKLINE, AND HOSEA R. TILLISON AND CHARLES W. H. BLOOD, OF BOSTON, MASSACHUSETTS, ASSIGNORS TO THE S. A. WOODS MACHINE COMPANY, OF BOSTON, MASSACHUSETTS.

PLANING-MACHINE.

SPECIFICATION forming part of Letters Patent No. 623,938, dated April 25, 1899.

Application filed March 21, 1896. Serial No. 584,268. (No model.)

*To all whom it may concern:*

Be it known that we, SOLOMON A. WOODS, of Brookline, county of Norfolk, and HOSEA R. TILLISON and CHARLES W. H. BLOOD, of Boston, county of Suffolk, State of Massachusetts, have invented an Improvement in Planing-Machines, of which the following description, in connection with the accompanying drawings, is a specification, like letters on the drawings representing like parts.

This invention in wood-planing or woodworking machines has especial reference to machines of the class wherein are provided both upper and under cutters, and particularly where an upper cutter is arranged as the first cutter of the machine and in advance of the lower cutter. In machines of this type it is necessary to provide in advance of the under cutter a work-support or platen, which shall be arranged below the top of said under cutter a distance equivalent to the desired depth of cut, and in addition thereto a second platen or support back or in the rear of said cutter, placed on the level of the top of said cutter to receive the work as it issues from the cutter. It is frequently desirable to vary the depth of cut of the upper or lower cutter or cylinder without varying the finished thickness of the stock—for example, some stock may be rougher at one side of the stock than at the opposite side, making it necessary to increase the depth of cut at one side and correspondingly lessen the depth of cut at the opposite side without varying the finished thickness—but this can only be done, first, by varying the level of the platen or bar, together with the entire bed of the machine, including the feeding-in rollers at the front of and relatively to the first under cutter, or, second, by varying the level of the cutter, together with the platen or bed and rollers, beyond and to the rear of the cutter. In machines as heretofore constructed, however, neither of these means is possible, because the parts referred to as a whole are built into the machine and must remain always in the same fixed relative or adjusted position.

One of the objects of our invention is to provide means by which the relative depths of cut at the opposite side of the stock may be varied without changing the finished thickness of the stock.

In the preferred embodiment of our invention we accomplish this by mounting upon the main or bed frame of the machine a supplemental frame or member carrying the feeding-in rollers and the platen, bar, or work-support, which precede the under cutter and form the bed or work-support for and beneath the first top cutter and also provide suitable means, preferably an inclined plane or planes, for conveniently varying the level of this supplemental frame or member to thereby vary the level at which the stock shall approach the upper and under cutters, and thereby vary the relative depths of cut at opposite sides of the stock without varying the distance between the cutters and the corresponding finished thickness of the stock.

Our invention further comprehends a novel construction of planing-machines in general.

Prior to our invention it has been customary in machines of this class to provide a massive bed-frame, usually composed of heavy side frames connected by suitable cross members, and in these side frames are formed suitable recesses or pockets for the under cutters, under feed-rollers, &c., the upper or co-operating parts being adjustably mounted upon standards erected upon this main or bed frame. This bed-frame is so massive that it is impracticable to place it in any particular machine capable of properly finishing the several pockets or recesses for the parts referred to, it being necessary to finish said pockets or recesses by the much more laborious and costly handwork. To overcome this difficulty and to more conveniently construct a machine, as well as to reduce the cost of construction, my present invention comprehends employing a main or bed frame substantially such as heretofore employed; but instead of forming the pockets or recesses for the various under cutters, rollers, and other parts working from beneath, together with the bed, platens, or other forms of work-support, in and as a part of this bed-frame, as heretofore, our present invention comprehends providing a plurality of superimposed supplemental frames adapted to be arranged, preferably, end to end and one close to another upon the main or bed frame, the under cutters, under feed-rollers, bed or platen, and the like being arranged upon these supplemental frames. The advantage of this novel construction is that each of these small supplemental bed-frames, with its plurality of parts adapted to operate from above and below upon the stock—such, for instance, as the upper and under coöperating feed-rollers, a cutter and its opposing work-support or platen, and the like—may be completely and independently finished by the use of improved machinery and completely set up, with its working parts in operative relation one to another, in the several departments of the shop, where the same can be most conveniently and economically produced. These several supplemental frames each carrying their respective working or coöperative working parts of the machine are then assembled upon the main or bed frame and bolted or otherwise suitably secured thereto, the several supplemental frames with their working parts and the main or bed frame coöperating to form a single unitary machine. A further advantage resulting from this construction is that a certain interchangeability of parts is provided, which renders it possible to completely change the character of the machine, for using the same bed-frame, and the size and type of the several supplementary frames erected upon the main or bed frame, together with the working parts carried by said frames, may be varied at will, and so change the character of the machine as to adapt it for entirely different types of work.

Other features of our invention will be hereinafter described, and particularly pointed out in the claims.

In the drawings, Figure 1, in side elevation, partially broken away, illustrates a woodworking-machine containing one embodiment of our invention; Fig. 2, a top or plan view of one of the adjustable supplemental frames; Fig. 3, a side elevation of Fig. 2; and Figs. 4 and 5 top and side views, respectively, of a sufficient portion of a machine illustrating a modification of a part of our invention. Fig. 6 is a top plan view of the machine. Fig. 7 is a central vertical longitudinal section thereof, and Fig. 8 is a top plan view of the frame with the supplemental frames removed.

Referring to the drawings illustrating one embodiment of our invention, A illustrates one of the side frames of a suitable main or bed frame of sufficient size and suitable construction to sustain the working parts of the machine, said main or bed frame being preferably provided at its upper edge with a continuous plane face $a$. Arranged upon this main or bed frame A are a plurality of what we denominate "supplemental" frames B, B', $B^2$, and $B^3$, each adapted to fit perfectly upon the main or bed frame and with the latter form a suitable rigid construction capable of withstanding the severe usage to which a machine of this type is subjected.

The supplemental frame B is herein shown as provided at its under side with a plurality of inclined lugs or faces $b\ b$, (shown in dotted lines, Figs. 1 and 3,) which rest at its entrance end upon corresponding but opposite inclines $a'$ on the main or bed frame A and at its feeding-out end upon a suitable incline $b'$, formed in and as a part of the supplemental frame B'.

A suitable adjusting device, shown as a shaft $b^2$, journaled in the main or bed frame, provided at its outer end with a suitable hand-wheel $b^3$ and threaded at its inner end to engage the supplemental frame B, furnishes means for moving said supplemental frame longitudinally of the machine to thereby, through the inclined supports described, cause vertical adjustment of the said frame for varying the level of its several parts. This supplemental frame B is provided with suitable recesses or pockets $b^4$ for the reception of the bearings for the journals $c$ of the under feed-rollers $c'$, shown as two in number, the upper feed-rollers $c^3$ being journaled in suitable bearings $c^4$, adjustably mounted in usual manner upon stands $c^5$, erected upon said supplemental frame B. The usual weighted lever $c^6$ (shown in dotted lines, Fig. 1) is herein fulcrumed at $c^7$ upon a bracket $c^8$, (shown also in dotted lines,) depending from and carried by this adjustable frame B, it being connected in suitable manner by connections $c^9$ and $c^{10}$ with and to control the pressure of the upper feed-rollers of the work passed beneath the same. The supplemental frame B also carries at its front end (see Fig. 2) a platen or work-support $c^{11}$, the same being preferably adjustably mounted upon the said frame B—as, for instance, by the bolts $c^{12}$ and slots $c^{13}$ (shown in Fig. 2)—to enable the distance between the edge of said support and the under cutter to be increased. This work-support or platen $c^{11}$ is arranged beneath and is opposed to—i. e., adapted to act upon the stock in opposition to the first or preparatory upper cutter $d$, shown as adjustably mounted in suitable manner in the stands $d'$, erected upon the supplemental frame B'.

The stands $d'$ and preferably the carrying-boxes for the cutter $d$ carry the inverted platen or work-support $d^2$, which is arranged over and constitutes a work-support in opposition to the under cutter $e$, journaled in suitable bearings in a box or frame $e'$, arranged upon the main or bed frame A in a recess or pocket formed between the supplemental frame B' at one side and the supplemental frame $B^2$ at the opposite side, said supplemental frames thereby constituting sides of the pocket in which the box or frame $e'$, carrying said under cutter, may be slid in and out at the side of the machine upon the dovetailed guide or plate $e^2$ (shown in Fig. 1) upon the main or bed frame.

The spout $f$ to conduct away the shavings from the under cutter $d$ is shown as formed in two parts, one part (indicated in dotted lines) in the frame or box $e'$ and the other in the supplemental frame $B^2$, the two parts registering when the cutter is in working position, one part, however, sliding past the other when the cutter is drawn endwise out of the side of the machine.

The supplemental frame $B^2$, as herein shown, carries one or more side heads $g$ and also has suitable pockets or recesses $g'$ for the bearings, containing the journals $g^2$ of the lower feeding-out roller $g^3$, opposed to which is the upper feeding-out roller $g^4$, journaled in suitable bearings $g^5$, adjustably mounted upon stands $g^6$, erected upon said supplemental frame $B^2$, the latter provided with a suitable platen or work-support $g^7$ to support the work adjacent the side heads. The second upper or finishing cutter $h$ is shown as journaled in usual manner upon the stands $h'$ of the supplemental frame $B^3$, the latter also carrying the platen or work-support $h^2$, arranged beneath and in opposition to the said upper cutter $h$. The several upper and under cutters may be adjusted as heretofore to produce different finished thicknesses of stock, and when it is desired to vary the relative depths of cut at opposite sides of the stock without varying the finished thicknesses of the same the supplemental frame B, herein carrying the parts described, may be raised or lowered by rotation of the hand-wheel $b^3$ to vary the level at which the stock approaches the first upper and under cutters. If it approaches at a higher level, the depth of cut at the upper side will be increased relatively to the depth of cut at the under side, and, vice versa, if the level of said supplemental frame be lowered the depth of cut at the under side of the stock will be increased relatively to the depth of cut at the upper side of the stock, all, however, without varying the finished thickness of the stock passed between said cutters. This variation in relative depths of cut is obtained without in any wise changing the adjusted position of any of the cutters and without in any wise varying the what may be fixed and permanent adjustment of the cutters and work-support table or bars beyond the work-support for the first cutter, so that our invention provides for the simplest possible construction for obtaining the desired end.

The main or driving shaft $m$ is shown at the feeding-in end of the machine, it being driven in suitable manner and belted by open and cross belts $m'$ and $m^2$ to and to drive the upper and under cutters $d$ and $e$, it being also belted to and to drive the feed-shaft $n$, journaled in suitable bearings in the main frame and provided with a pinion $n'$, meshing with a larger wheel $n^2$, also journaled in said frame and having its shaft provided in turn with a second pinion $n^3$. (All shown in dotted lines, Fig. 1.) The pinion $n^3$ meshes with a toothed wheel $n^4$, journaled in suitable bearings in the supplemental frame B, said wheel $n^4$, through the medium of an intermediate wheel $n^5$, driving a similar wheel $n^6$, said wheels $n^4$ and $n^6$ being fast on the journals of the lower feeding-in rollers $c'$, the upper feeding-in rollers being driven in usual manner therefrom.

It will be noticed that the supplemental frame B when adjusted causes the toothed wheel $n^4$ to move relatively to its driving-pinion $n^3$ in the direction of a tangent to the pitch-line of said driving-pinion, said tangent being of course parallel with the inclined planes on which said supplemental frame is adjusted, so that a considerable range of adjustment is provided for without complicating the driving mechanism.

The feed-rollers $g^3$ and $g^4$ may be driven in suitable and usual manner, herein by connecting a sprocket-wheel $o$ on the shaft of the pinion $n^3$ by a sprocket-chain $o'$ with a sprocket-wheel $o^2$, journaled in suitable bearings in the frame adjacent the feed-roller $g^2$, said sprocket-wheel being connected with a toothed gear $o^3$, in mesh with and driving a gear $o^4$, fast on the roller-shaft $g^3$, from which the upper roller is driven in usual manner.

In Figs. 4 and 5 we have shown a slightly-modified form of our invention, wherein the adjusting-shaft $r$, provided with a hand-wheel $r'$, passes laterally through the frame and is connected by beveled gears $r^2$ with the longitudinal worm-shafts $r^3$, provided, respectively, with worms in mesh with worm-wheels $r^4$ on the vertically-arranged adjusting-shafts $r^5$, upon which the bearings for the lower feeding-in rollers rest, said shafts $r^3$ at their lower ends being herein represented as threaded for engagement with the nuts $r^6$ in ears of the work-supporting platen $c^{11}$, which latter is mounted upon an incline, as in Figs. 1 and 2. Rotation of the hand-wheel $r'$ thus causes simultaneous vertical adjustment of the bearings for the feeding-in rollers and the platen or work-support for the first upper cutter, as in the construction Figs. 1 to 3, inclusive; but we desire it to be understood that our invention is not necessarily limited to the simultaneous adjustment of these parts.

The term "work-support" as employed herein and in the claims includes any support for the work to hold it in proper alinement or position against a working device or cutter of the machine, whether said work support is inverted in, arranged above a cutter, or arranged beneath a cutter, or whether it is in the form of a platen or otherwise.

We claim—

1. In a planing-machine, an under-surface cutter, an upper-surface cutter in front of said under cutter, a work-support in advance of the said under cutter and opposed to said upper cutter, means to adjust said work-support, and one or more side cutters fixed at the rear of said under cutter, substantially as described.

2. In a planing-machine, an under-surface cutter, an upper-surface cutter in front of said under cutter, a work-support in advance of said under cutter, means to adjust said work-support up and down relatively to said upper cutter, one or more side cutters fixed at the rear of said under cutter, an upper finishing-cutter at the rear of said side cutters, and means to adjust said finishing-cutter relatively thereto, substantially as described.

3. In a planing-machine, a main frame, upper and under cutters, the supplemental frame adjustably mounted on said main frame and carrying the feed-rollers, driving-gears mounted on said main frame and intermeshing driving-gears mounted on and adjustable with said supplemental frame and connected with and to drive said feed-rollers or any of them, the line of relative movement between said main and supplemental frames being parallel with a tangent to the intermeshing gears on said main and supplemental frames, substantially as described.

4. In a machine of the class described, a main frame, combined with a plurality of superimposed supplemental frames arranged end to end on said main frame, each of said supplemental frames being formed in one integral piece extending from side to side of the main frame and provided with coöperating parts adapted to engage both from above and below, the work passed between them, said supplemental frames when assembled on said main frame together constituting part of a single and entire machine, substantially as described.

5. In a machine of the class described, a main or bed frame, combined with the supplemental frames B, B', B² and B³, each supplemental frame consisting of a single integral casting extending from side to side of the main frame, and the under-cutter frame or box all arranged upon said main frame, and constructed and operating substantially as and for the purpose described.

6. In a machine of the class described, the combination with the main bed-frame, of the supplemental frame B', carrying an upper-surface cutter and an inverted work-support, the supplemental frame B² carrying upper and under feeding-rollers and side cutters, each of said supplemental frames being cast in one piece and extending from side to side of the main frame, and the under-surface cutter and its supporting frame or box arranged between said supplemental frames B' and B², the latter forming side walls of a pocket in which said under-cutter frame or box is endwise movable, substantially as described.

7. In a machine of the class described, the combination with a main frame, of an under cutter and its frame adapted to be drawn out laterally from said main frame, and a two-part shaving spout or conductor one part on and movable with said under-cutter frame and the other carried on said main frame, the former sliding past the latter and said two parts registering when said under cutter is in position, substantially as described.

In testimony whereof we have signed our names to this specification in the presence of two subscribing witnesses.

SOLOMON A. WOODS.
HOSEA R. TILLISON.
CHARLES W. H. BLOOD.

Witnesses:
GEO. W. GREGORY,
MARGARET A. DUNN.